(12) United States Patent
Harrell (10) Patent No.: US 12,148,020 B2
(45) Date of Patent: *Nov. 19, 2024

(54) AUTOMATIC POPULATION OF DATA FOR CHECKOUT INTERFACE

(71) Applicant: PayPal, Inc., San Jose, CA (US)

(72) Inventor: Jeff Harrell, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 17/562,835

(22) Filed: Dec. 27, 2021

(65) Prior Publication Data

US 2022/0122152 A1 Apr. 21, 2022

Related U.S. Application Data

(63) Continuation of application No. 15/076,749, filed on Mar. 22, 2016, now Pat. No. 11,250,492.

(51) Int. Cl.
| | | |
|---|---|---|
| *G06Q 20/38* | (2012.01) | |
| *G06Q 20/36* | (2012.01) | |
| *G06Q 20/40* | (2012.01) | |
| *G06Q 30/0601* | (2023.01) | |

(52) U.S. Cl.
CPC ..... *G06Q 30/0633* (2013.01); *G06Q 20/3674* (2013.01); *G06Q 20/401* (2013.01); *G06Q 30/0643* (2013.01)

(58) Field of Classification Search
USPC .......................................................... 705/67
See application file for complete search history.

(56) References Cited

U.S. PATENT DOCUMENTS

| | | |
|---|---|---|
| 5,805,740 A | 9/1998 | Takagi et al. |
| 6,356,970 B1 | 3/2002 | Killian et al. |
| 6,778,519 B1 | 8/2004 | Harrell et al. |
| 7,058,699 B1 | 6/2006 | Chiou et al. |
| 7,617,491 B1 | 11/2009 | Nedderman |

(Continued)

OTHER PUBLICATIONS

Abdellaoui R., et al., "Secure Communication For Internet Payment in Heterogeneous Networks," 24th IEEE International Conference on Advanced Information Networking and Applications, 2010, 8 pages.

*Primary Examiner* — Chinedu C Agwumezie
(74) *Attorney, Agent, or Firm* — HAYNES AND BOONE, LLP (57) ABSTRACT

An engagement by a user with respect to an interactive component is detected. The interactive component is embedded in a first display area of an electronic device. The first display area displays a plurality of fields of an online merchant checkout page. A second display area is launched in response to the detected engagement of the interactive component. The second display area contains information with respect to a payment provider. User input is received via the second display area. The user input contains information regarding an account that the user has with the payment provider. The user is authenticated based on the user input. User account information pertaining to the payment provider is accessed. At least a portion of the user account information is tokenized. At least one of the fields of the online merchant checkout page is automatically populated with the tokenized portion of the user account information.

20 Claims, 8 Drawing Sheets

(56) References Cited

U.S. PATENT DOCUMENTS

| | | |
|---|---|---|
| 7,934,253 B2 | 4/2011 | Overcash et al. |
| 8,317,090 B2 | 11/2012 | Wiesman et al. |
| 9,037,963 B1 | 5/2015 | Chandi et al. |
| 9,374,442 B1 | 6/2016 | Nedderman |
| 9,697,101 B1 | 7/2017 | Chen et al. |
| 9,737,359 B2 | 8/2017 | Livneh |
| 9,760,871 B1 | 9/2017 | Pourfallah et al. |
| 10,693,884 B1 | 6/2020 | Harris et al. |
| 10,748,170 B2 | 8/2020 | El-Hage |
| 10,762,554 B2 | 9/2020 | Balasubramanian et al. |
| 10,846,670 B2 | 11/2020 | Chawla et al. |
| 11,250,492 B2 * | 2/2022 | Harrell ............... G06Q 30/0643 |
| 2002/0186255 A1 | 12/2002 | Shafron et al. |
| 2005/0027575 A1 | 2/2005 | Amitabh et al. |
| 2005/0240798 A1 | 10/2005 | Benedek et al. |
| 2007/0245327 A1 | 10/2007 | Dietz et al. |
| 2008/0193860 A1 | 8/2008 | Hains |
| 2008/0270209 A1 | 10/2008 | Mauseth et al. |
| 2009/0070413 A1 | 3/2009 | Priyadarshan et al. |
| 2009/0106296 A1 | 4/2009 | Sickmiller et al. |
| 2010/0076851 A1 | 3/2010 | Jewell, Jr. |
| 2010/0114740 A1 | 5/2010 | Dominguez et al. |
| 2013/0041824 A1 | 2/2013 | Gupta |
| 2013/0138569 A1 | 5/2013 | Yan et al. |
| 2013/0151414 A1 | 6/2013 | Zhu et al. |
| 2013/0297691 A1 * | 11/2013 | Collins ................. G06Q 50/01 709/204 |
| 2013/0346476 A1 | 12/2013 | Jasperson |
| 2014/0095354 A1 | 4/2014 | Hegarty et al. |
| 2014/0143151 A1 * | 5/2014 | Dhar ..................... G06Q 50/01 705/44 |
| 2014/0172548 A1 | 6/2014 | Garlick |
| 2014/0173708 A1 | 6/2014 | Garlick |
| 2014/0344106 A1 | 11/2014 | Lee et al. |
| 2015/0082151 A1 | 3/2015 | Liang et al. |
| 2015/0095238 A1 * | 4/2015 | Khan ................... G06Q 20/382 705/71 |
| 2015/0120678 A1 | 4/2015 | Kong et al. |
| 2015/0134734 A1 | 5/2015 | Bishop |
| 2015/0146925 A1 | 5/2015 | Son et al. |
| 2015/0161406 A1 | 6/2015 | Fox et al. |
| 2015/0287046 A1 | 10/2015 | Richards et al. |
| 2016/0000537 A1 | 1/2016 | Schneider |
| 2016/0267153 A1 | 9/2016 | Witkop et al. |
| 2016/0364701 A1 * | 12/2016 | Nayfack ........... G06Q 20/0855 |
| 2016/0364759 A1 * | 12/2016 | Glover ................... H04W 4/70 |
| 2017/0017958 A1 | 1/2017 | Scott et al. |
| 2017/0032694 A1 | 2/2017 | Brueckner et al. |
| 2017/0046759 A1 * | 2/2017 | Chandrasekaran .... G06Q 20/12 |
| 2017/0109002 A1 | 4/2017 | Ghanekar et al. |
| 2017/0116596 A1 | 4/2017 | Tsui et al. |
| 2017/0278174 A1 | 9/2017 | Harrell |
| 2017/0322944 A1 | 11/2017 | Farr et al. |
| 2017/0330187 A1 | 11/2017 | Kohli |
| 2017/0357976 A1 | 12/2017 | Malik et al. |
| 2018/0121925 A1 | 5/2018 | Gaikar et al. |
| 2018/0211561 A1 | 7/2018 | Jones |
| 2018/0240178 A1 | 8/2018 | Lee et al. |
| 2018/0255049 A1 | 9/2018 | Tang |
| 2018/0293573 A1 | 10/2018 | Ortiz et al. |
| 2018/0365255 A1 | 12/2018 | Kim et al. |
| 2019/0065803 A1 | 2/2019 | Burke et al. |
| 2019/0392431 A1 | 12/2019 | Chitalia et al. |
| 2020/0104789 A1 | 4/2020 | Porco |

\* cited by examiner

AUTOMATIC POPULATION OF DATA FOR CHECKOUT INTERFACE

CROSS REFERENCE TO RELATED APPLICATIONS

The present application is a continuation application of U.S. patent application Ser. No. 15/076,749, filed Mar. 22, 2016, and is incorporated in reference in its entirety.

BACKGROUND

Online transactions are becoming more and more prevalent, with an ever-increasing number of online entities that may or may not have a physical real world counterpart. Furthermore, the services offered by these online entities have been improving as well. The popularity of online transactions is partially attributable to the ease and convenience of making a transaction online instead of at a physical location. As the number of merchants offering online goods or services increases, it may be cumbersome for consumers to have to set up payment information individually with each online merchant. Consumers may prefer to pay for all online transactions using a single payment service, such as a third party payment provider (e.g., PayPal, Inc. of San Jose, California). However, many online merchants are not integrated with, or do not support, such third party payment providers. Thus, when consumers shop with these merchants, they would still have to set up the payment information with the merchants, rather than being able to enjoy the convenience of using the third party payment provider for payment.

Therefore, although existing systems and methods of performing online payments are generally adequate for their intended purposes, they have not been entirely satisfactory in every aspect. What is needed is an enhanced online payment scheme where a consumer has the power to choose a desired payment provider to pay for goods or services offered by an online merchant, even if the online merchant does not directly support the desired payment provider.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

Online transactions are becoming more and more prevalent, with an ever-increasing number of online entities that may or may not have a physical real world counterpart. Furthermore, the services offered by these online entities have been improving as well. The popularity of online transactions is partially attributable to the ease and convenience of making a transaction online instead of at a physical location. Unfortunately, the popularity of online transactions has also led to an increase in online fraud activities. For example, hackers have hacked into victims' accounts at various retailers or merchants, which in many cases led to stolen credit card numbers and fraudulent purchases. Due to these security breaches, consumers may be hesitant to provide their credit card numbers to complete an online transaction, since they know that the credit card numbers could be illegally intercepted. In other cases, consumers may simply not remember his/her credit card number, since it usually is a long number consisting of meaningless digits. Therefore, even if the consumer is willing to provide his/her credit card number in association with an online transaction, he/she has to get the actual credit card out of the wallet and enter the credit card number online, which is inconvenient.

To enhance the information security associated with online transactions, and to improve the consumer's shopping experience, the present disclosure allows consumers to conduct online transactions using dummy or fake credit card numbers, as discussed in more detail with reference to FIGS. 1-11.

Figure 1:
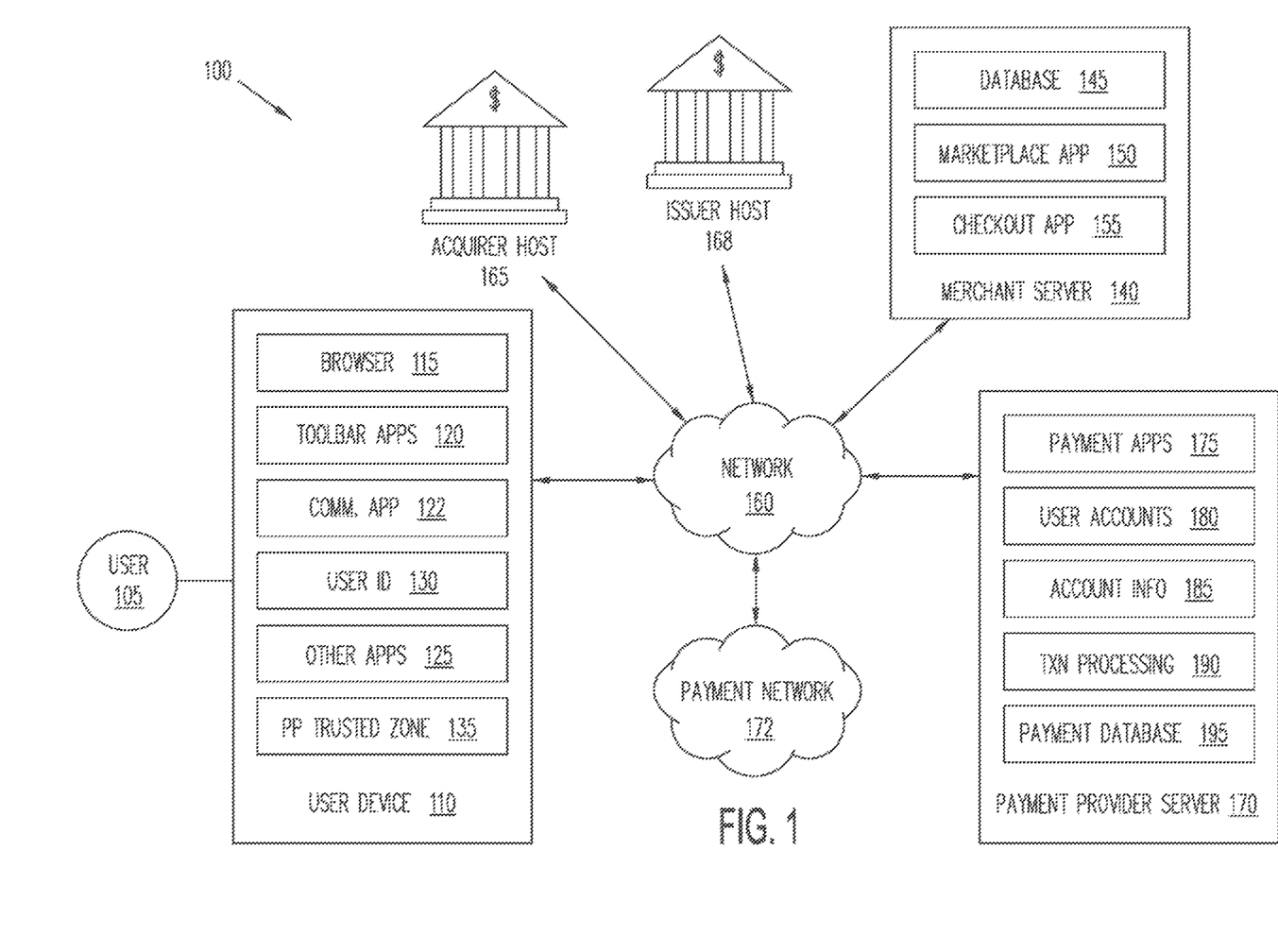
FIG. 1 is block diagram of a networked architecture suitable for conducting electronic online transactions according to embodiments of the present disclosure.

FIG. 1 is block diagram of a networked system or architecture suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PayPal, Inc. of San Jose, California A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100. In conjunction with user identifiers 130, user device 110 may also include a secure zone 135 owned or provisioned by the payment service provider with agreement from device manufacturer. The secure zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

User device 110 may install and execute a payment application received from the payment service provider to facilitate payment processes. The payment application may allow a user to send payment transaction requests to the payment service provider. In particular, the payment application may authenticate user 105 before making payments. In an embodiment, the payment application may implement automatic authentication of the user 105 when the user 105 is at certain payment locations. The payment application in conjunction with the payment service provider may also provide proxies for user's credentials and funding instruments (e.g., payment and identity proxies for transaction) within secure zone 135 to be used with/without further authentication with payment service provider depending on the transaction or payment situation. The payment application may also receive relevant payment and identity proxies from proximity based ancillary systems such as a Bluetooth beacon installed in the merchant's premises in association with the payment service provider for the purpose of processing transactions or providing value added services to the user.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Account information may also include user purchase history and user ratings. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

In one embodiment, payment provider server 170 may include a token vault storing various information on token formats, conventions, data, and the like. For example, a token may be generated for a user's payment account to allow payment transactions using the token. A user's identity information, preferences, or other information may be stored and associated with the user's account and mapped to tokens. Merchant accounts at the payment provider server 170 also may store merchant's information, such as type of merchant, product or service offered, method of payments, and the like to ensure diversified use of tokens that may vary by merchant type/service etc.

Payment network 172 may be operated by payment card service providers or card associations, such as DISCOVER®, VISA®, MASTERCARD®, AMERICAN EXPRESS®, RUPAY®, CHINA UNION PAY®, etc. The payment card service providers may provide services, standards, rules, and/or policies for issuing various payment cards. A network of communication devices, servers, and the like also may be established to relay payment related information among the different parties of a payment transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at various merchants who agreed to accept the payment card.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Figure 2:
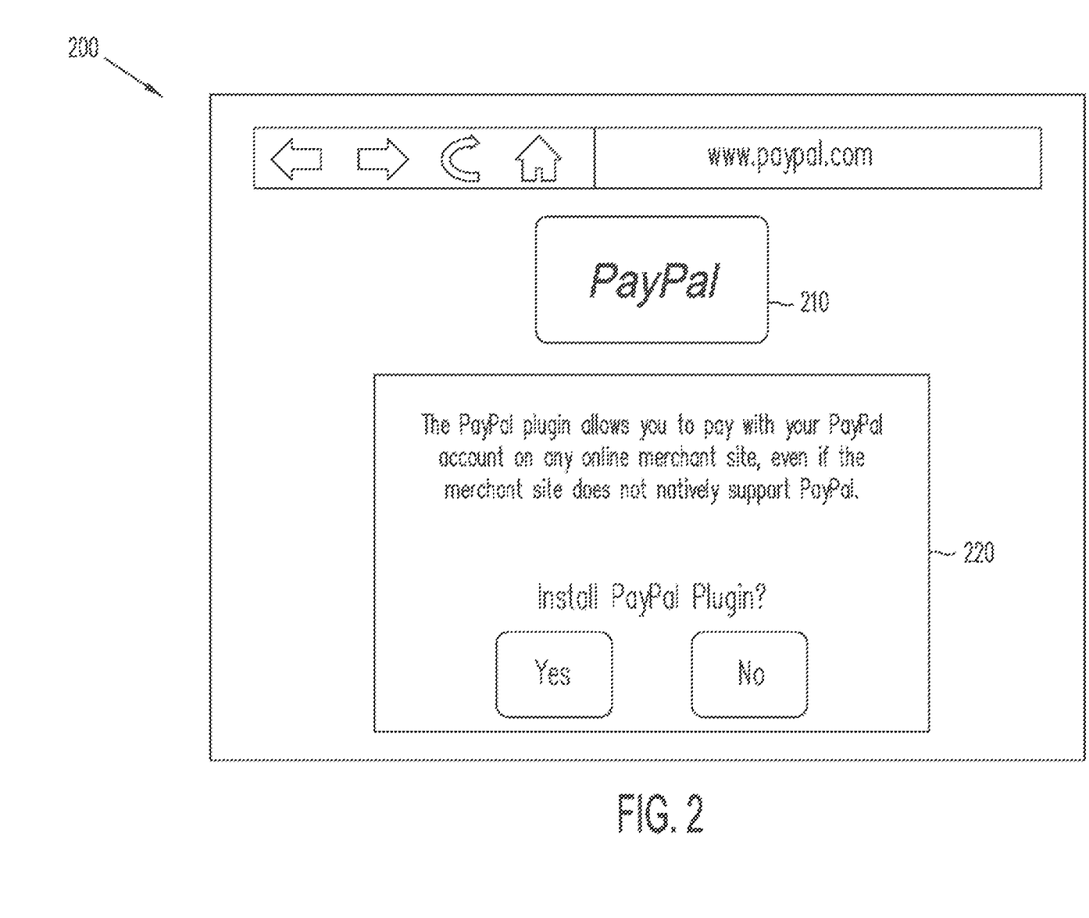
FIGS. 2-8 illustrate example user interfaces of an electronic device displaying a page that is automatically populated via a plugin component according to embodiments of the present disclosure.

FIG. 2 illustrates an example web page 200 displayed on an electronic device. The electronic device may include a smartphone or a tablet computer, for example an Apple® iPhone®, an Android® phone, or a Windows® phone, an Apple® iPad®, an Android® tablet, or a Windows® Surface® tablet, a laptop computer, or a desktop computer. The web page 200 is a web page of a third party payment provider, for example PAYPAL®, Inc. of San Jose, CA. Via the web page 200, the third party payment provider offers an interactive web component 210 to be downloaded and installed by a user of the electronic device.

In some embodiments, the interactive web component 210 includes a "plugin." As an example, a plugin may be a web browser plugin, which contains a library (e.g., a library offered by the third party payment provider) to a web browser such as INTERNET EXPLORER®, FIREFOX®, CHROME®, SAFARI®, etc. Once installed, the library can be embedded inside a web page, for example using an <embed> tag or a <object> tag. In some embodiments, web browser plugins allow interaction with the user through JavaScript. For example, a plugin may display additional web browser windows containing fields for receiving input from the user, draw animations, or change the display of the current web page in which it is embedded, etc. As examples, common plugins include MACROMEDIA FLASH®, MICROSOFT SILVERLIGHT®, APPLE QUICKTIME®, ETC.

In some other embodiments, the interactive web component 210 may include an "extension" (also commonly referred to as an "add-on"). An example extension may be a web browser extension, which can add additional materials to the browser user interface or perform additional processing to a web page. Whereas a plugin affects a web page in which it is embedded, an extension can affect the web browser itself. Of course, an extension can be configured to perform tasks that the plugin is capable of performing. An example extension may be the GOOGLE VOICE® extension offered for CHROME®. As non-limiting examples, extensions can be written in the C++ programming language or JavaScript.

In the embodiment shown in FIG. 2, the interactive component 210 includes a plugin that allows the user to use services offered by the third party payment provider on other web sites, even if the web sites do not natively support the services of the third party payment provider. The web page 200 may display an example message 220 that explains the functionality of the plugin 210. The message 220 states, "The PayPal plugin allows you to pay with your PayPal account on any online merchant site, even if the merchant site does not natively support PayPal." The message 220 then asks the user whether or not he/she wishes to install the plugin. If the user selects "No", the plugin 210 will not be installed. If the user selects "Yes", the plugin 210 will be installed in one or more web browsers on the user's electronic device.

Figures 3, 4:
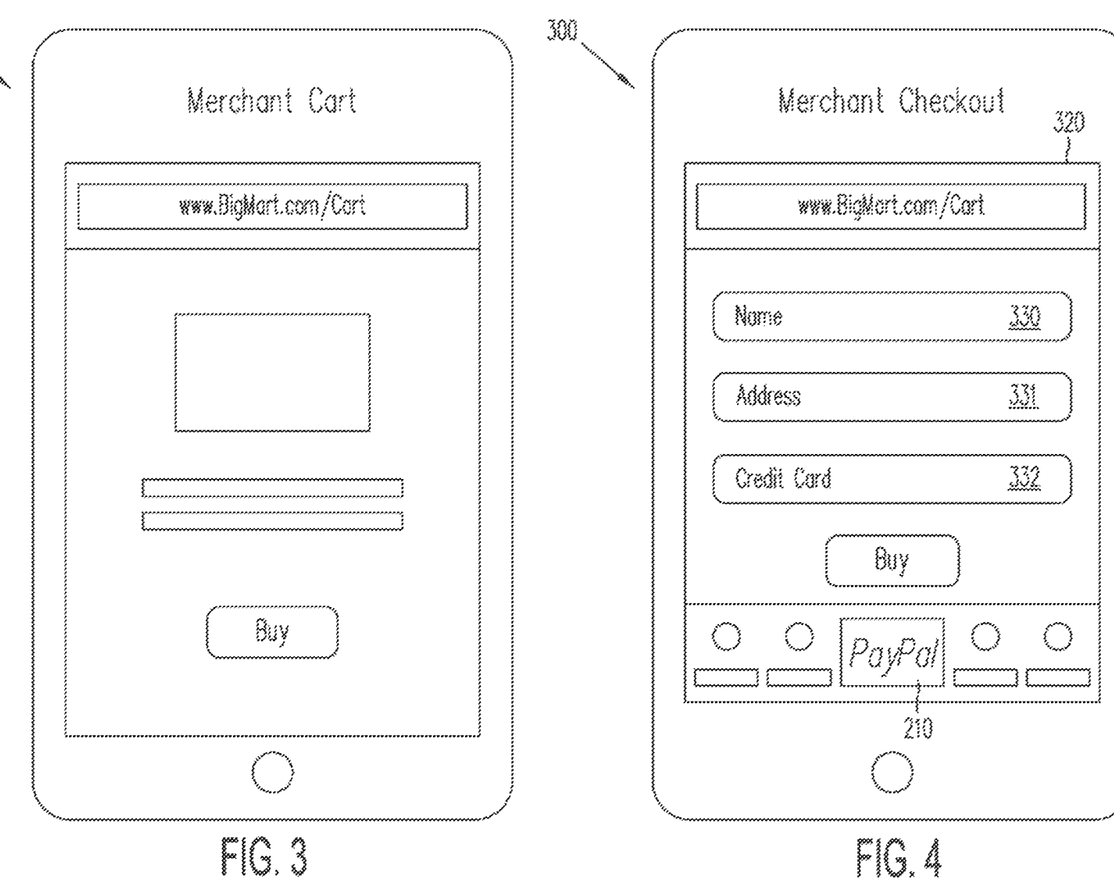

FIGS. 3-8 are a series of simplified screenshots of a mobile electronic device 300 to illustrate a context or situation in which the interactive component is used. As discussed above, the mobile electronic device 300 may include a smartphone or a tablet computer, or a laptop or desktop computer. In the embodiment shown in FIGS. 3-8, a suitable user interface may be displayed on a touchscreen of the mobile electronic device 300. The touchscreen may be a capacitive touchscreen or a resistive touchscreen that responds to a user engagement via a finger or a stylus. The user interface displayed on the touchscreen may be a portion of a web page or a portion of an "app." In the example embodiment shown in FIG. 3, the user has shopped electronically at a web site of an example merchant "BigMart." FIG. 3 illustrates the virtual shopping cart containing the goods or services that the user intends to buy from BigMart.

Referring now to FIG. 4, the user is now presented with a checkout screen or checkout page 320 of BigMart. The checkout page 320 of BigMart may be displayed in a browser window, within a browser tab, or within a mobile app developed and offered by BigMart. The checkout page 320 contains a plurality of fields 330-332 that the user needs to fill in before the transaction can be completed. For example, the field 330 prompts the user to enter a name of the user, the field 331 prompts the user to enter an address (e.g., shipping address, or payment address), and the field 332 prompts the user to enter a credit card number as a form of payment.

As discussed previously, the user may not want to fill in the fields 330-332, in particular the field 332. One concern may be electronic information security. The user may not want to supply a personal credit card number, because he/she may not completely trust the merchant BigMart, or may lack confidence that BigMart can adequately protect the user's credit card information from hackers. Additionally, the user may find it cumbersome to have to set up payment information every time the user shops at a new online merchant. For at least these reasons, the user may wish to use payment services provided by the third party payment provider, since the user has already set up his/her account with the third party payment provider, and the user also trusts the third party payment provider to implement sufficient electronic information security measures to protect the user's account.

Suppose that the user had previously installed the interactive component 210 (e.g., the plugin) discussed above with reference to FIG. 2, the checkout page 320 of BigMart will display an embedded icon that represents the interactive component 210. The icon and the interactive component 210 may be referred to interchangeably hereinafter. The user may click on the interactive component 210 (or engage with it in other ways such as tapping, pressing, or holding down the interactive component 210, with either a finger, a stylus, or a mouse) to trigger the payment flow using the third party payment provider.

Figure 5:
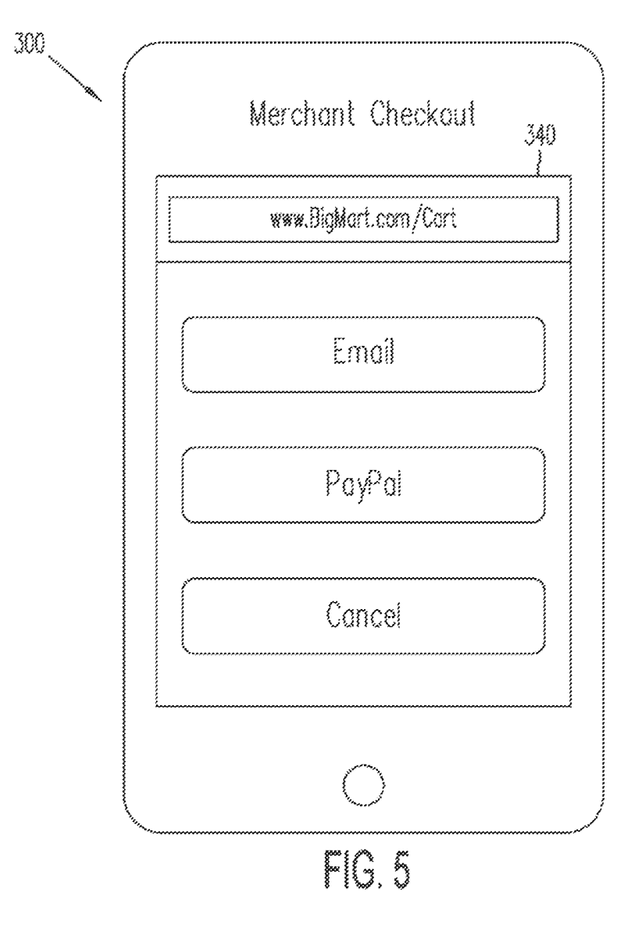

In response to the user clicking on the interactive component 210, the interactive component 210 is activated. According to some embodiments, the interactive component 210 performs an electronic examination of the underlying computer code for the checkout page 320. In some embodiments, a regex (stands for Regular Expressions) pattern matching technique may be employed to complete this step. As a part of the electronic examination, the interactive component 210 scans the programming code to look for keywords or terms (e.g., keywords or terms involving the third party payment provider), so as to determine whether the checkout page 320 natively supports the third party payment provider. If the interactive component 210 determines that the checkout page 320 does indeed support the third party payment provider, it may display a page 340 as shown in FIG. 5, in which the user may log into his/her account with the third party payment provider (e.g., by clicking on the "PayPal" button) to pay for the goods or services purchased at BigMart. In other words, the page 340 shown in FIG. 5 may be considered part of a "normal" checkout flow offered by BigMart, since the checkout page 320 natively supports the third party payment provider.

Figure 6:
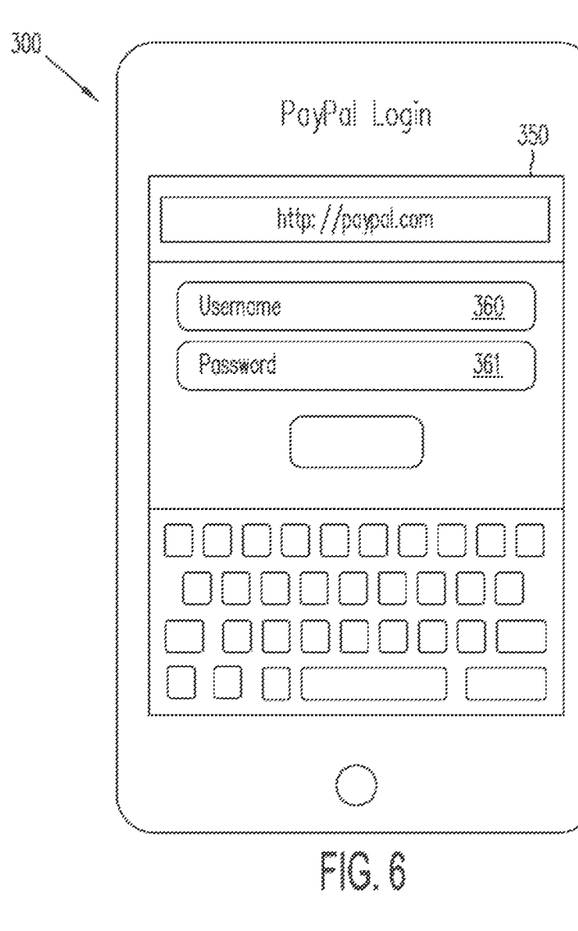

However, if the interactive component 210 determines that the checkout page 320 does not natively support the third party payment provider, it may display a page 350 as shown in FIG. 6. The page 350 may be a separate browser window, a separate browser tab, or a separate screen (within an app) from the checkout screen 320. In some embodiments, the page 350 may be a window that "slides up or down" over the checkout page 320. In other words, the page 350 may be temporarily overlaying the checkout page 320. The page 350 may direct the user to the web site of the third party payment provider, for example http://paypal.com. The page 350 allows the user to authenticate himself/herself to gain access to his/her account with the third party payment provider. For example, the page 350 may contain a username field 360 and a password field 361.

Figure 7:
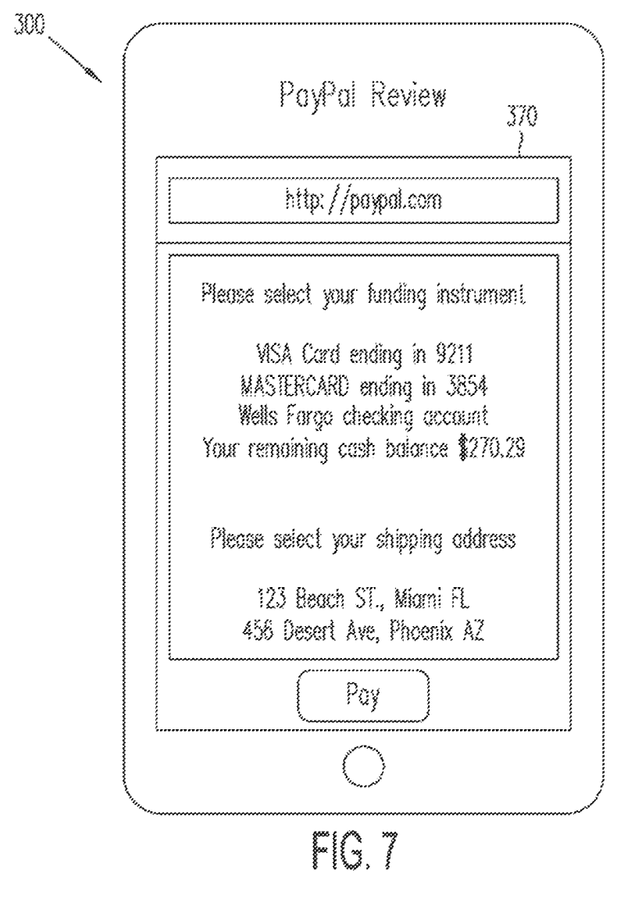

Referring now to FIG. 7, upon entering a correct combination of username and password in the fields 360-361, the user is logged into the account with the third party payment provider, as shown in a page 370. The page 370 offers the user access to his/her account information. For example, the page 370 may display a list of funding instruments that the user has previously associated with the third party payment provider. The funding instruments may include, but are not limited to, a credit card (e.g., VISA card ending in 9211 or MASTERCARD ending in 3854), a checking account with a financial entity (e.g., Wells Fargo checking account), a savings account with a financial entity, a money market account with a financial entity, a CD (certificate of deposit) with a financial entity, a brokerage account with a financial entity, or the user's remaining money balance with the third party payment provider (e.g., Your remaining cash balance $270.29). The user may select any one of these funding instruments to pay for his/her purchases made with BigMart. As another example, the page 370 also displays one or more shipping addresses (e.g., 123 Beach St., Miami FL, or 456 Desert Ave, Phoenix AZ). Other examples of user account information may include user profiles, statements, transactions, account preferences, etc. After selecting a desired funding instrument and shipping address, the user may click on the "Pay" button to continue.

The third party payment provider typically offers greater levels of security than online merchants. As an example security measure, the third party payment provider can tokenize one or more portions of the user account information. In the embodiment herein, the funding instrument selected by the user is tokenized. In more detail, instead of submitting the user's sensitive financial information such as a real credit card number, an electronic payment "token" is generated to serve as a proxy for the real credit card number. The token may be generated from random numbers but may appear and function as an equivalent to the real credit card number. The token may be configured for a one-time use only. Thus, if the token is compromised (e.g., intercepted by a hacker), it would not otherwise affect the consumer's real credit card number, since a different token may be generated the next time the consumer makes a payment. In this manner, tokenization can safeguard the consumer's sensitive information.

Furthermore, electronic tokenization of the user's selected funding instrument may enable the user to pay with a non-credit card (or debit card) funding instrument, even though a merchant such as BigMart may otherwise require a funding instrument in the format of a credit card. For instance, the user may select the Wells Fargo checking account or the remaining cash balance with the third party payment provider as a funding instrument, neither of which is in the format of a credit card. Due to the format differences, the user cannot directly supply these funding instruments at the online merchant checkout page 320 (FIG. 4), sine the field 332 is expecting a credit card number. Here, the tokenization of the user-selected funding instrument (Wells Fargo checking account or the remaining cash balance with the third party payment provider) generates a token that is in the format of a valid credit card number. As such, the token can be used in the field 332 at the checkout page 320.

Additional aspects regarding electronic tokenization are discussed in U.S. patent application Ser. No. 14/979,866, filed on Dec. 28, 2016, entitled "Optimizing Tokens for Identity Platforms", the contents of which are hereby incorporated by reference in its entirety.

Figure 8:
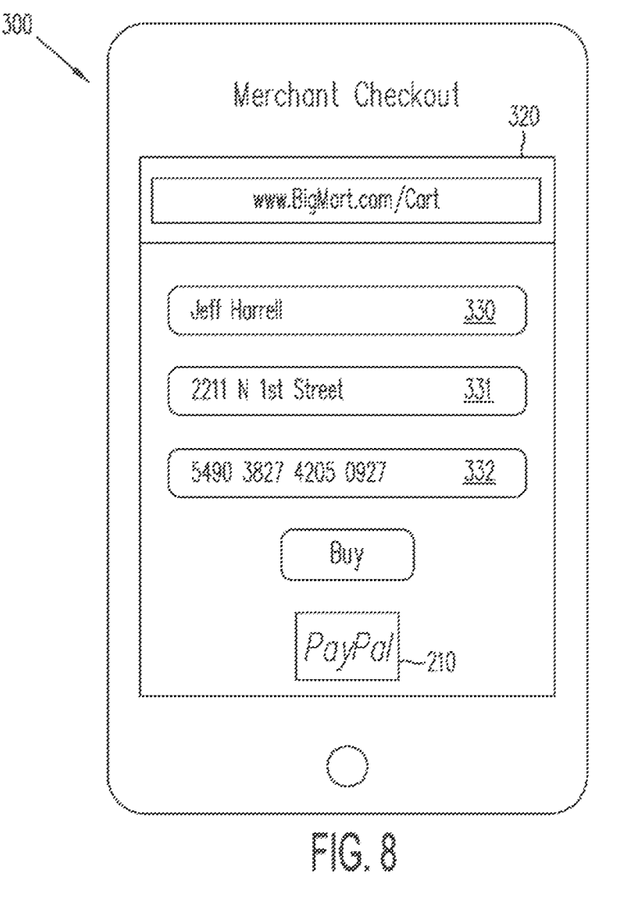

Referring now to FIG. 8, after the user decides to proceed after selecting the desired funding instrument and address, the page 370 is closed (e.g., by sliding up or down), and the user is taken by to the online checkout page 320. The interactive component 210 automatically populates the fields 330-332 on the checkout page 320 of the online merchant BigMart. The fields 330-332 are populated with the user's account information retrieved in FIG. 7. The automatic population of the fields 330-332 means that the user does not need to manually type in the information. The automatic population may involve the interactive component 210 electronically examining the computer code for the checkout page 320 to determine what fields need to be filled, and how these fields correspond to the user account information retrieved from the third party payment provider previously. In some embodiments, a regex pattern matching technique may be employed to complete this step.

As discussed above, the payment information field 332 is automatically populated with the tokenized user-selected funding instrument, which is an electronic payment token in the form of a credit card number that the field 332 expects to see. At this point, the user may check out on the page 320 to pay for the goods or services purchased. In this manner, the user has the power to pay with the third party payment provider, even though the online merchant BigMart does not natively support the third party payment provider.

In some embodiments, another task performed by the interactive component 210 is that it notifies third party payment provider the fact that its services are not natively supported by the online merchant (BigMart in this example). The third party payment provider may create an electronic database to save a list of merchants that do not natively support the third party payment provider's services. The third party payment provider may then reach out to these merchants and offer them plans for integrating the third party payment provider's services with their merchant checkout pages. In some embodiments, the saving of the list of merchants into the electronic database as well as the subsequent follow up with the merchants (e.g., recruiting them to offer native integration with the third party payment provider's services) may be performed by one or more electronic processors, for example by the electronic processors on the electronic device of the user discussed above, or by electronic processors of a remote server.

Figure 9:
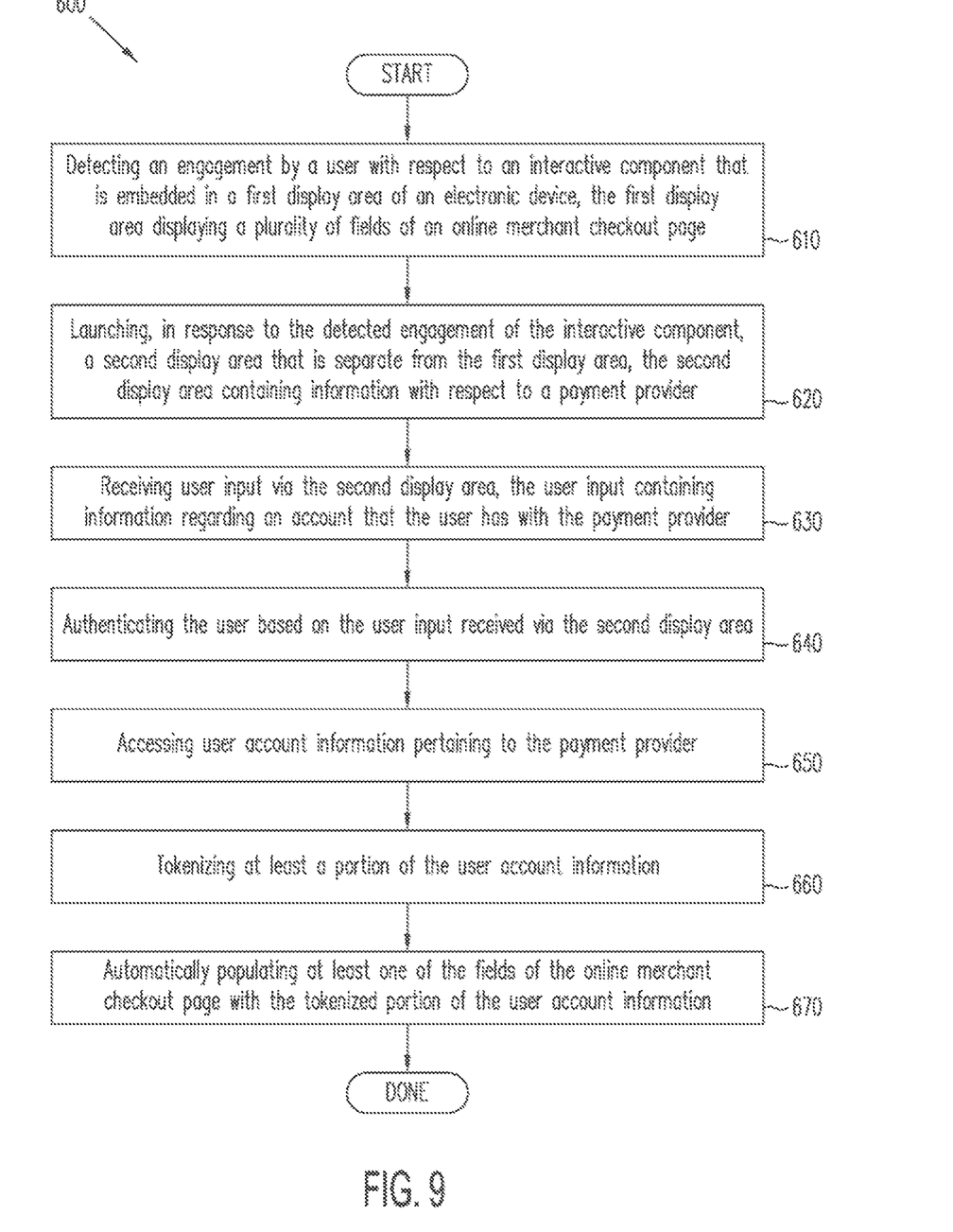
FIG. 9 is a flowchart illustrating a method of automatically populating fields on a page via a plugin component according to an embodiment of the present disclosure.

FIG. 9 is a flowchart illustrating a method 600 of making online payments according to the various aspects of the present disclosure discussed above. The method 600 includes a step 610 of detecting an engagement by a user with respect to an interactive component that is embedded in a first display area of an electronic device. The first display area displays a plurality of fields of an online merchant checkout page. In some embodiments, at least one of the fields comprises a payment information field, for example a field where a user can enter a credit card number to pay for the user's purchases at the online merchant checkout page.

In some embodiments, the interactive component comprises a web browser plugin component. In other embodiments, the interactive component comprises a web browser extension.

The method 600 includes a step 620 of launching, in response to the detected engagement of the interactive component, a second display area that is separate from the first display area. The second display area contains information with respect to a payment provider. In some embodiments, the first display area comprises a first web browser window or a first web browser tab, and the second display area comprises a second web browser window or a second web browser tab.

The method 600 includes a step 630 of receiving user input via the second display area. The user input contains information regarding an account that the user has with the payment provider.

The method 600 includes a step 640 of authenticating the user based on the user input received via the second display area.

The method 600 includes a step 650 of accessing user account information pertaining to the payment provider.

The method 600 includes a step 660 of tokenizing at least a portion of the user account information. In some embodiments, the tokenizing comprises generating a one-time electronic payment token based on a user-selected funding instrument. The funding instrument may include a credit card, a bank account, or a money balance in the user account with the payment provider. In some embodiments, the one-time electronic payment token is configured to be processed in lieu of a credit card.

The method 600 includes a step 670 automatically populating at least one of the fields of the online merchant checkout page with the tokenized portion of the user account information. In some embodiments, the automatically populating comprises automatically populating the payment information field (in the online merchant checkout page) with the one-time electronic payment token.

In some embodiments, at least one of the detecting, the launching, the receiving, the authenticating, the accessing, the tokenizing, and the automatically populating steps 610-670 is performed at least in part by one or more electronic processors.

It is understood that at least some of the steps 610-670 may be performed at least in part by one or more electronic processors of the electronic device, which may be a smartphone or a tablet computer. Alternatively, these steps may be performed by one or more electronic processors of a system that is located remotely from the electronic device, or at least in part by an app installed on the electronic device.

It is also understood that additional method steps may be performed before, during, or after the steps 610-670 discussed above. For example, in some embodiments, the method 600 further includes a step of performing an electronic examination of computer code of the online merchant checkout page, and a step of determining, based on the electronic examination, that the online merchant checkout page does not natively support the payment provider. In these embodiments, the launching of the second display area is performed only in response to a determination that the online merchant checkout page does not natively support the payment provider. As another example, the method 600 may include a step of identifying a merchant that provided the online merchant checkout page, and a step of saving the merchant into an electronic database. The electronic database containing a list of online merchants that do not natively support the payment provider. In that case, the payment provider can send offers to the online merchants on the list to recruit them so that they will natively integrate the option to pay for goods or services using the payment provider. It is also understood that one or more of the steps of the method 600 described herein may be omitted, combined, or performed in a different sequence as desired.

Figure 10:
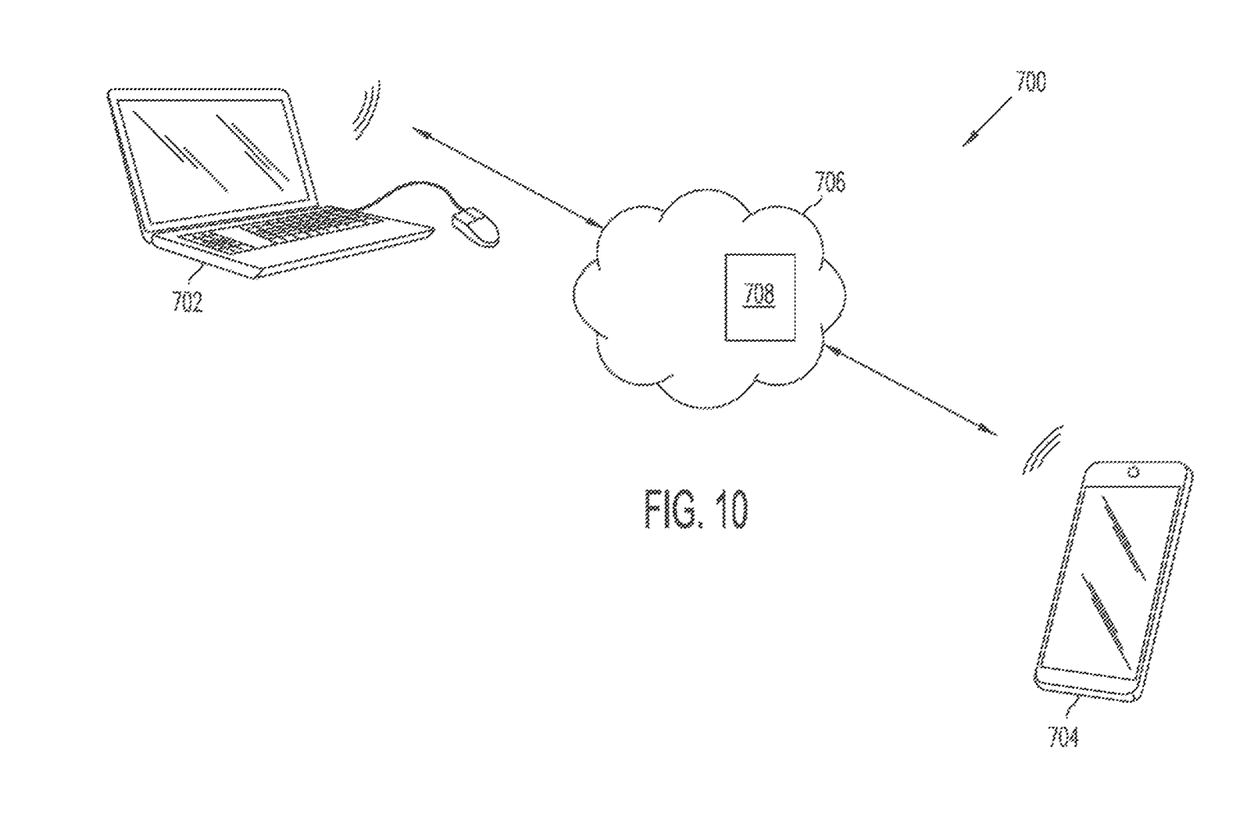
FIG. 10 is a diagram illustrating an example cloud computing architecture according to embodiments of the present disclosure.

FIG. 10 illustrates an example cloud-based computing architecture 700, which may also be used to implement various aspects of the present disclosure. The cloud-based computing architecture 700 includes a mobile device 704 and a computer 702, both connected to a computer network 706 (e.g., the Internet or an intranet). In one example, a consumer has the mobile device 704. The computer 702 and the mobile device 704 may each be configured to download and install the plugin or extension discussed above, so that the user may use a third party payment provider to perform checkout at an online merchant, even if the online merchant does not natively support the third party payment provider.

The computer 702 and the mobile device 704 may each be in communication with cloud-based resources 708, which may include one or more computers, such as server computers, with adequate memory resources to handle requests from a variety of users. The server computers may include servers from the third party payment provider. The plugin (or extension) on the computer 702 or on the mobile device 704 may report, to the cloud-based resources 708 (e.g., to the servers from the third party payment provider) which online merchants still do not natively support the third party payment provider's services. A list of such merchants may be saved electronically using the cloud-based resources 708. In some embodiments, the functionality between the mobile device 704 and the cloud-based resources 708 may be divided up in any appropriate manner. For example, an app on mobile device 704 may perform basic input/output interactions with the user, but a majority of the processing and caching may be performed by the cloud-based resources 708. However, other divisions of responsibility are also possible in various embodiments.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702.

It is understood that the various components of cloud-based computing architecture 700 are shown as examples only. For instance, a given user may access the cloud-based resources 708 by a number of devices, not all of the devices being mobile devices. Similarly, a merchant or another user may access resources 708 from any number of suitable mobile or non-mobile devices. Furthermore, the cloud-based resources 708 may accommodate many merchants and users in various embodiments.

Figure 11:
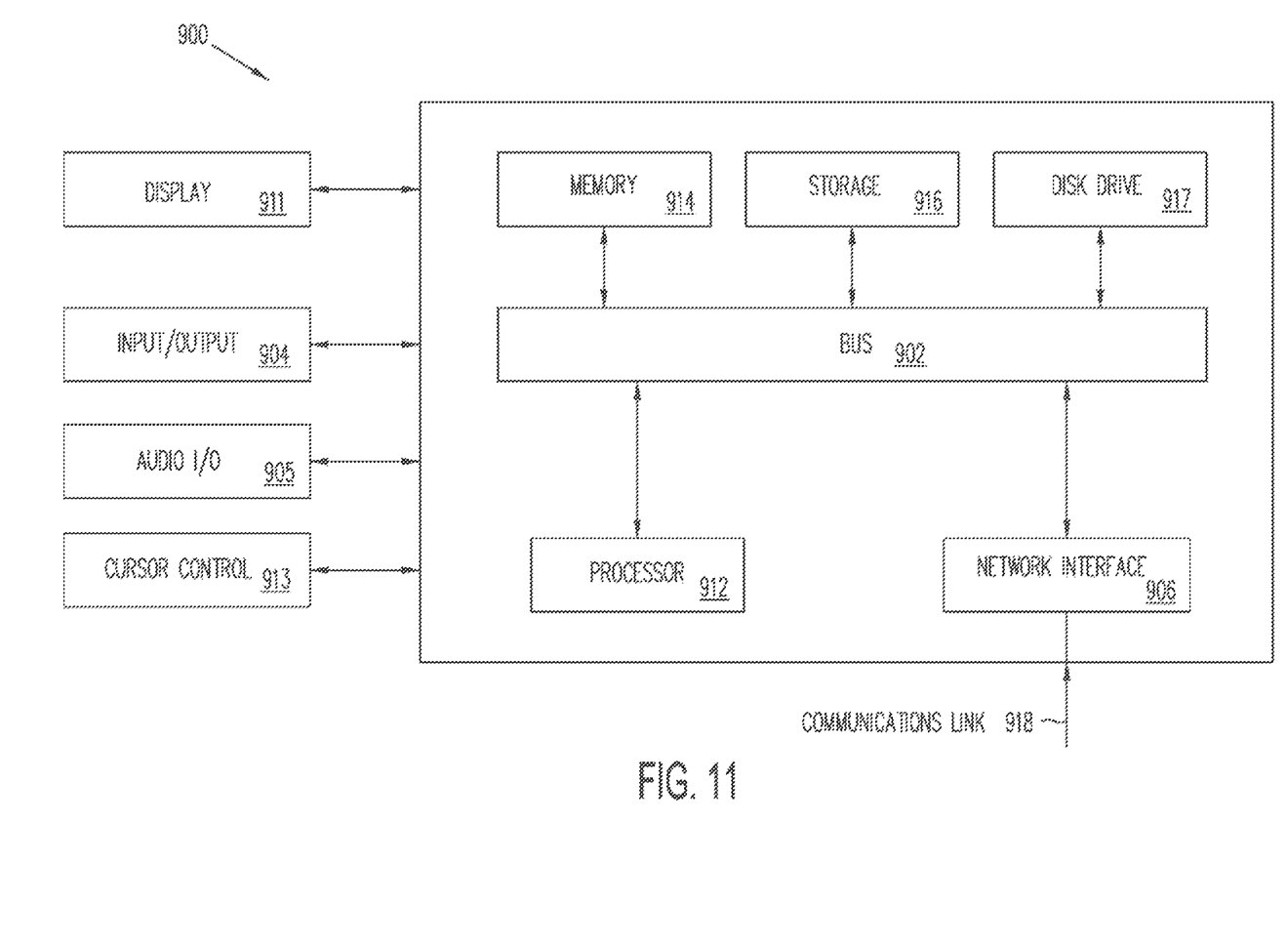
FIG. 11 is a block diagram of a computer system suitable for implementing one or more components in FIG. 1 according to embodiments of the present disclosure.

FIG. 11 is a block diagram of a computer system 900 suitable for implementing one or more embodiments of the present disclosure. In various implementations, the user device may comprise a personal computing device (e.g., smart phone, a computing tablet, a personal computer, laptop, wearable device, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 900 in a manner as follows.

Computer system 900 includes a bus 902 or other communication mechanism for communicating information data, signals, and information between various components of computer system 900. Components include an input/output (I/O) component 904 that processes a user action, such as selecting keys from a keypad/keyboard, selecting one or more buttons or links, etc., and sends a corresponding signal to bus 902. I/O component 904 may also include an output component, such as a display 911 and a cursor control 913 (such as a keyboard, keypad, mouse, etc.). An optional audio input/output component 905 may also be included to allow a user to use voice for inputting information by converting audio signals. Audio I/O component 905 may allow the user to hear audio. A transceiver or network interface 906 transmits and receives signals between computer system 900 and other devices, such as another user device, a merchant server, or a payment provider server via network 360. In one embodiment, the transmission is wireless, although other transmission mediums and methods may also be suitable. A processor 912, which can be a micro-controller, digital signal processor (DSP), or other processing component, processes these various signals, such as for display on computer system 900 or transmission to other devices via a communication link 918. Processor 912 may also control transmission of information, such as cookies or IP addresses, to other devices.

Components of computer system 900 also include a system memory component 914 (e.g., RAM), a static storage component 916 (e.g., ROM), and/or a disk drive 917. Computer system 900 performs specific operations by processor 912 and other components by executing one or more sequences of instructions contained in system memory component 914. Logic may be encoded in a computer readable medium, which may refer to any medium that participates in providing instructions to processor 912 for execution. Such a medium may take many forms, including but not limited to, non-volatile media, volatile media, and transmission media. In various implementations, non-volatile media includes optical or magnetic disks, volatile media includes dynamic memory, such as system memory component 914, and transmission media includes coaxial cables, copper wire, and fiber optics, including wires that comprise bus 902. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 900. In various other embodiments of the present disclosure, a plurality of computer systems 900 coupled by communication link 918 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The present disclosure offers various advantages over conventional online shopping schemes. It is understood, however, that not all advantages are necessarily disclosed herein, different embodiments may offer different advantages, and that no particular advantage is required for all embodiments.

One advantage is that the implementation of the plugin (or extension) empowers the consumers in making purchases. Rather than being dictated by the online merchants as to what payment methods are acceptable, the consumers may select the preferred payment provider to make purchases, regardless of whether that payment provider is natively supported by the online merchant. Thus, consumer satisfaction is increased. Another advantage is that the third party payment provider typically offers better security than the online merchants. As such, confidential or sensitive consumer information may be better protected. Yet another advantage is that the online merchant checkout is simplified by the automatic population of the fields at the checkout page. Rather than having to set up an account (including payment information) with each new online merchant, the consumer only needs to remember his authentication information with the third party payment provider. The plugin (or extension) extracts the relevant information and tokenizes them as needed (e.g., tokenizing the funding instrument), so that the fields of the online merchant checkout page can be automatically filled without the user having to perform manual entry. A further advantage is that the third party payment provider may use the plugin (or extension) as an investigative tool to easily identify which online merchants do not natively support the third party payment provider's services yet. The third party payment provider may then reach out to these online merchants to upsell its payment services, so that the online merchant may integrate the payment services offered by the third party payment provider in its checkout. This will help improve the popularity and the ubiquity of the third party payment provider.

One aspect of the present disclosure involves an electronic system. The system includes a non-transitory memory storing instructions. The system includes one or more hardware processors coupled to the non-transitory memory. The one or more hardware processors are configured to read the instructions from the non-transitory memory to cause the system to perform operations comprising: detecting an engagement by a user with respect to an interactive component that is shown in a first display area, the first display area displaying a plurality of fields of an online merchant checkout; launching, in response to the detected engagement of the interactive component, a second display area that is separate from the first display area, the second display area containing information pertaining to a payment provider; receiving user input via the second display area, the user input containing user authentication information with respect to the payment provider; and automatically populating at least one of the fields of the online merchant checkout in response to the user being successfully authenticated by the payment provider, the at least one of the fields of the online merchant checkout being automatically populated based on data received from the payment provider after the user is successfully authenticated.

Another aspect of the present disclosure involves a method of making electronic payments online. The method includes: detecting an engagement by a user with respect to an interactive component that is embedded in a first display area of an electronic device, the first display area displaying a plurality of fields of an online merchant checkout page; launching, in response to the detected engagement of the interactive component, a second display area that is separate from the first display area, the second display area containing information with respect to a payment provider; receiving user input via the second display area, the user input containing information regarding an account that the user has with the payment provider; authenticating the user based on the user input received via the second display area; accessing user account information pertaining to the payment provider; tokenizing at least a portion of the user account information; and automatically populating at least one of the fields of the online merchant checkout page with the tokenized portion of the user account information; wherein at least one of the detecting, the launching, the receiving, the authenticating, the accessing, the tokenizing, and the automatically populating is performed at least in part by one or more electronic processors.

Yet another aspect of the present disclosure involves a non-transitory machine-readable medium having stored thereon machine-readable instructions executable to cause a machine to perform operations comprising: detecting a user engagement of a browser plugin component, the browser plugin component being embedded in a first browser screen displayed on an electronic device, the first browser screen containing a payment information field as a part of an online merchant checkout page; triggering a display of a second browser screen in response to the detected engagement of the browser plugin component, the second browser screen being separate from the first browser screen and containing information that allows the user to access an account the user has with a payment provider; granting, to the user, access of the account based on user authentication information received via the second browser screen; identifying a user-selected funding instrument available in the account; generating an electronic payment token based on the user-selected funding instrument; closing the second browser screen; and automatically filling the payment information field with the electronic payment token.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a processor; and
   a non-transitory computer-readable medium having stored thereon instructions that are executable by the processor to cause the system to perform operations comprising:
   causing a display, on a user device of a user, of a message corresponding to an interactive component of a service provider, the message containing an option selectable by the user to initiate a downloading of the interactive component onto the user device;
   detecting, after the interactive component has been downloaded onto the user device, an engagement made by the user with respect to a graphic that represents the interactive component while the user device is displaying a plurality of fields of an online merchant checkout via a first display area, wherein the plurality of fields include a field for entering payment information corresponding to a payment provider that is different from the service provider, and wherein the graphic and the field for entering payment information are separately but simultaneously displayed in the first display area;
   determining, based on an electronic examination of computer code of the online merchant checkout after the interactive component has been downloaded onto the user device, that the online merchant checkout does not natively support payment transactions via the service provider;
   launching, in response to the detected engagement of the graphic and the determining, a second display area that is separate from the first display area, the second display area containing information pertaining to the service provider;
   receiving a user input via the second display area, the user input containing user authentication information with respect to the service provider; and
   automatically populating, with specific data, at least one of the plurality of fields of the online merchant checkout in response to the user being successfully authenticated by the service provider, the at least one of the plurality of fields of the online merchant checkout being automatically populated based on data received via the service provider after the user is successfully authenticated.

2. The system of claim 1, wherein the system comprises the user device.

3. The system of claim 1, wherein the first display area comprises a first web browser window or a first web browser tab, and the second display area comprises a second web browser window or a second web browser tab.

4. The system of claim 1, wherein the operations further comprise:
   facilitating a completion of the online merchant checkout using the automatically populated specific data.

5. The system of claim 1, wherein the specific data includes a one-time credit card number, wherein the one-time credit card number corresponds to a particular user account of the user with the service provider.

6. A non-transitory computer-readable medium having stored thereon instructions that are executable by a computer system to cause the computer system to perform operations comprising:
   causing a display, on a user device of a user, of a message corresponding to an interactive component of a service provider, the message containing an option selectable by the user to initiate a downloading of the interactive component onto the user device;
   detecting, after the interactive component has been downloaded onto the user device, an engagement made by the user with respect to a button that represents the interactive component, wherein the detecting is made while the user device is displaying a plurality of fields of an online merchant checkout via a first display area, wherein the plurality of fields include a field for entering payment information corresponding to a payment provider that is different from the service provider, and wherein the button and the field for entering payment information are separately but simultaneously displayed in the first display area;
   determining, using an electronic examination of computer code of the online merchant checkout, that the online merchant checkout does not natively support payment transactions via the service provider, wherein the electronic examination of computer code occurs after the interactive component has been downloaded onto the user device;
   launching, in response to the detected engagement of the button and the determining, a second display area that is separate from the first display area, the second display area containing information pertaining to the service provider;
   receiving a user input via the second display area, the user input containing user authentication information with respect to the service provider; and
   automatically populating, with specific data, at least one of the plurality of fields of the online merchant checkout in response to the user being successfully authenticated by the service provider, the at least one of the plurality of fields of the online merchant checkout being automatically populated based on data received via the service provider after the user is successfully authenticated.

7. The non-transitory computer-readable medium of claim 6, wherein the determining comprises a determination that a particular webpage code corresponding to the service provider is not present within the online merchant checkout.

8. The non-transitory computer-readable medium of claim 6, wherein the non-transitory computer-readable medium comprises stored code that is executable within a computer program of the user device, wherein the computer program of the user device is configured to display downloaded internet content to the user device.

9. The non-transitory computer-readable medium of claim 8, wherein the computer program of the user device comprises a web browser.

10. The non-transitory computer-readable medium of claim 9, wherein the stored code comprises a plugin extension for the web browser.

11. The non-transitory computer-readable medium of claim 6, wherein the first display area comprises a first web browser window or a first web browser tab, and the second display area comprises a second web browser window or a second web browser tab.

12. The non-transitory computer-readable medium of claim 6, wherein the operations further comprise:
facilitating a completion of the online merchant checkout using the automatically populated specific data.

13. The non-transitory computer-readable medium of claim 6, wherein the specific data includes a one-time credit card number, wherein the one-time credit card number corresponds to a particular user account of the user with the service provider.

14. The non-transitory computer-readable medium of claim 6, wherein the computer system comprises the user device.

15. A method, comprising:
causing a display, on a user device of a user, of a message corresponding to an interactive component of a service provider, the message containing an option selectable by the user to initiate a downloading of the interactive component onto the user device;
detecting, after the interactive component has been downloaded onto the user device, an engagement made by the user with respect to a graphic that represents the interactive component, wherein the user device is displaying a plurality of fields of an online merchant checkout via a first display area during the detecting, wherein the plurality of fields include a field for entering payment information corresponding to a payment provider that is different from the service provider, and wherein the graphic and the field for entering payment information are separately but simultaneously displayed in the first display area;
accessing a result of an electronic examination of computer code of the online merchant checkout, wherein the electronic examination is performed after the interactive component has been downloaded onto the user device;
determining, based on the accessing of the result of the electronic examination, that the online merchant checkout does not natively support payment transactions via the service provider;
launching, in response to the detected engagement of the graphic and the determining, a second display area that is separate from the first display area, the second display area containing information pertaining to the service provider;
receiving, at the user device, a user input via the second display area, the user input containing user authentication information with respect to the service provider; and
automatically populating, with specific data, at least one of the plurality of fields of the online merchant checkout in response to the user being successfully authenticated by the service provider, the at least one of the plurality of fields of the online merchant checkout being automatically populated based on data received via the service provider after the user is successfully authenticated.

16. The method of claim 15, wherein the determining that the online merchant checkout does not natively support payment transactions via the service provider is performed at the user device.

17. The method of claim 15, further comprising:
facilitating a completion of the online merchant checkout using the automatically populated specific data.

18. The method of claim 15, wherein the specific data includes a one-time credit card number, wherein the one-time credit card number corresponds to a particular user account of the user with the service provider.

19. The method of claim 15, wherein the determining comprises a determination that particular webpage code corresponding to the service provider is not present within the online merchant checkout.

20. The method of claim 15, further comprising executing code that is a part of a computer program of the user device, wherein the computer program of the user device is configured to display downloaded internet content to the user device.

* * * * *